(12) United States Patent
Mori

(10) Patent No.: US 9,227,426 B2
(45) Date of Patent: Jan. 5, 2016

(54) PRINTING APPARATUS AND PRINTING METHOD

(71) Applicant: TOSHIBA TEC KABUSHIKI KAISHA, Shinagawa-ku, Tokyo (JP)

(72) Inventor: Futoshi Mori, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/156,791

(22) Filed: Jan. 16, 2014

(65) Prior Publication Data

US 2015/0197099 A1 Jul. 16, 2015

(51) Int. Cl.
*B41J 2/35* (2006.01)
*B41J 2/355* (2006.01)
*G06K 15/02* (2006.01)
*B41J 2/365* (2006.01)
*B41J 2/325* (2006.01)
*B41J 2/32* (2006.01)

(52) U.S. Cl.
CPC ............... *B41J 2/355* (2013.01); *G06K 15/028* (2013.01); *B41J 2/32* (2013.01); *B41J 2/325* (2013.01); *B41J 2/365* (2013.01)

(58) Field of Classification Search
None
See application file for complete search history.

(56) References Cited

U.S. PATENT DOCUMENTS

| 2004/0190047 A1* | 9/2004 | Ito et al. ................. 358/1.15 |
| 2010/0002065 A1* | 1/2010 | Koyabu ................... 347/215 |
| 2011/0012979 A1* | 1/2011 | Kitamura ................ B41J 2/36 347/218 |

FOREIGN PATENT DOCUMENTS

JP 03169666 A * 7/1991

* cited by examiner

*Primary Examiner* — Lisa M Solomon
(74) *Attorney, Agent, or Firm* — Amin, Turocy & Watson, LLP

(57) ABSTRACT

A printing apparatus comprises an ink ribbon conveyance section; a recording medium conveyance section; a thermal head which comprises, in the printing section, heat generating elements for thermally transferring the ink of the ink ribbon onto the recording medium; a platen member; a thermal head moving section; a temperature measurement section configured to measure ambient temperature; and a control section configured to drive the thermal head moving section to move the thermal head to the second position when the recording medium is conveyed in a conveyance direction reverse to a conveyance direction for printing and when the ambient temperature measured by the temperature measurement section is above a specific head-up temperature.

8 Claims, 4 Drawing Sheets

PRINTING APPARATUS AND PRINTING METHOD

FIELD

Embodiments described herein relate to a technology of carrying out a printing by thermally transferring ink from an ink ribbon to a recording medium using a thermal head.

BACKGROUND

Generally, as a printing apparatus which prints words, numbers, barcodes and the like on a recording medium such as a label or a paper wound in a roll shape (hereinafter referred to as a paper roll) with an ink ribbon, there is known a thermal printer which is called as a label printer or a barcode printer.

With a ribbon roll wound in the rolled shape being set on a delivering shaft, the ink ribbon is wound on a winding reel mounted on a ribbon winding shaft through a certain ink ribbon conveyance path. A platen roller and a thermal head are arranged opposite to each other and across the ink ribbon in the ink ribbon conveyance path. Further, the paper roll mounts a delivering reel on a holder, and the front end of the paper roll is guided from the conveyance roller section to pass through the space between the platen roller and the thermal head to discharge to the outside from a paper discharging opening. The paper roll is overlapped with the ink ribbon between the platen roller and the thermal head, and a printing is carried out through a thermal transfer which is realized by heating the ink ribbon using the thermal head and transferring the melted ink to a paper.

However, in a case of printing with an ink ribbon, an ink ribbon may be cut off or a white blank occurs during a printing. It is considered that one of the reasons for the occurrence of this phenomenon generally lies in the adhesion of a paper roll to the ink ribbon, which sometimes occurs when the ambient temperature of a printing apparatus is high. Especially, the quality of an ink ribbon cannot be guaranteed if ambient temperature is high, and it tends to an adhesion when the paper roll is returned for a given length during a reverse feeding. At this time, the adhesion caused by the contact of the paper roll to the ink ribbon based on the thermal head can be found here and there.

DETAILED DESCRIPTION

The printing apparatus involved in the embodiment comprises an ink ribbon conveyance section configured to convey an ink ribbon through a printing section; a recording medium conveyance section configured to convey a recording medium to a paper discharging opening through the printing section; a thermal head which comprises, in the printing section, heat generating elements for thermally transferring the ink of the ink ribbon onto the recording medium; a platen member configured in the printing section opposite to the thermal head; a thermal head moving section configured to enable the thermal head to press the platen member via overlapped ink ribbon and recording medium so as to move the thermal head between a first position where a thermal transferring is carried out onto the recording medium and a second position where the thermal head is separated from the platen member; a temperature measurement section configured to measure ambient temperature; and a control section configured to drive the thermal head moving section to move the thermal head to the second position when the recording medium is conveyed in a conveyance direction reverse to a conveyance direction for printing and when the ambient temperature measured by the temperature measurement section is above a specific head-up temperature.

According to the printing method involved in the embodiment, an ink ribbon is conveyed through a printing section; and a recording medium is conveyed to a paper discharging opening through the printing section; in the printing section, the ink of the ink ribbon is thermally transferred onto the recording medium by a thermal head equipped with heat generating elements; a platen member is configured in the printing section opposite to the thermal head; during a printing process, the thermal head is moved to a first position to press the platen member via overlapped ink ribbon and recording medium to carry out a thermal transferring onto the recording medium, and the thermal head is moved to a second position where the thermal head is separated from the platen member when the recording medium is conveyed in a conveyance direction reverse to a conveyance direction for printing and when the ambient temperature measured by the temperature measurement section is above a specific head-up temperature.

The printing apparatus involved in the embodiment is described below with reference to accompanying drawings.

Figure 1:
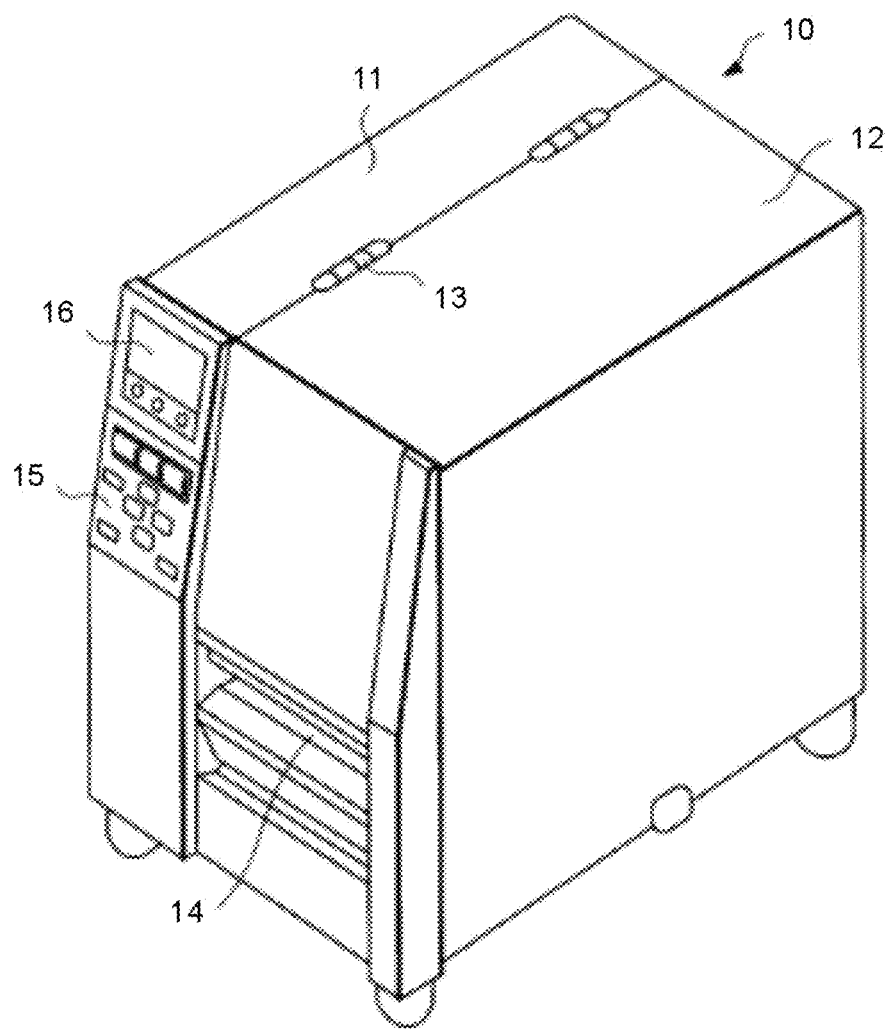
FIG. 1 is an oblique view illustrating the whole configuration of a printing apparatus involved in an embodiment.

FIG. 1 is an oblique view illustrating the whole configuration of a printing apparatus involved in an embodiment. In FIG. 1, a printing apparatus 10 comprises a control box 11 for housing a printer engine and a cover 12 which is connected with the control box 11 by a hinge 13 in an openable/closable manner. A discharging opening 14 for discharging a printed recording medium (label paper) is arranged on the front side of the cover 12, an operation section 15 and a display section 16 for displaying operation information and an operation menu are arranged on the front side of the control box 11.

Figure 2:
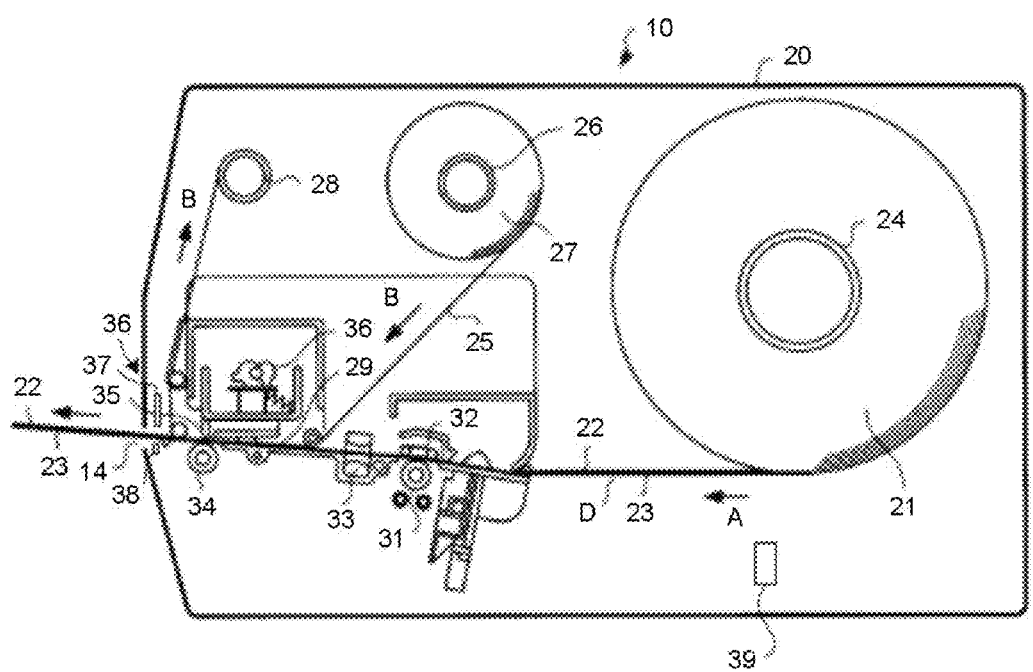
FIG. 2 shows the internal structure at the loading side of an ink ribbon and a roll-shaped paper of the printing apparatus shown in FIG. 1.

FIG. 2 is a structure diagram illustrating the internal configuration of the printing apparatus 10 in a state of an opened cover 12 shown in FIG. 1.

A paper roll 21 is housed in a housing 20. The paper roll 21 is rotationally held on a paper holder 24. The paper roll 21 is formed by winding a backing paper 23 affixed with the label paper 22 serving as a recording medium into a rolled shape. The paper roll 21 is wound with the backing paper 23 facing the outside. An adhesion layer is arranged on the surface of the label paper 22 contacted with the backing paper 23, and if needed, the label paper 22 can be peeled from the backing paper 23. Hereinafter, the label paper 22 and the backing paper 23 are collectively referred to as a paper D. The paper D is conveyed in the arrow A direction shown in FIG. 2.

An ink ribbon roll 27 for winding an ink ribbon 25 on a ribbon supply shaft 26 and a ribbon winding shaft 28 for winding and holding the ink ribbon 25 supplied from the ink ribbon roll 27 are arranged in the housing 20. The ink ribbon 25 supplied from the ink ribbon roll 27 is supplied towards the arrow B and wound on the ribbon winding shaft 28 through a conveyance path 29.

A conveyance roller 31 and a pinch roller 32 for conveying the paper D supplied from the paper roll 21, a paper detection sensor 33 for detecting the paper D and a platen roller 34 for conveying the ink ribbon 25 and the paper D are arranged in the housing 20. The conveyance roller 31, the pinch roller 32 and the platen roller 34 are located on a conveyance route for the paper D. Moreover, the conveyance roller 31, the pinch roller 32 and the platen roller 34 constitute a conveyance section which conveys the paper D supplied from the paper roll 21 along the conveyance route.

Further, a thermal head 35 is arranged above and opposite to the platen roller 34, and the ink ribbon 25 and the paper D are clamped between the platen roller 34 and the thermal head 35.

The thermal head 35 is fixed below a moving mechanism 36 and has heat generating elements on the apical portion on the under surface thereof. A plurality of heat generating elements are arranged along the axis direction of the platen roller 34 in a direction (a primary scanning direction) vertical to the conveyance direction of the label paper 22 at given intervals.

On the other hand, the ink ribbon 25 wound in the ink ribbon roll 27 is supplied towards the label paper 22 through the conveyance path 29 for the ink ribbon. The ink ribbon 25, after passing through the space between the platen roller 34 and the thermal head 35 while being overlapped on the label paper 22, is oriented upwards and wound on the ribbon winding shaft 28.

The thermal head 35 moves up or down with respect to the platen roller 34 with the moving mechanism 36, and when the thermal head 35 is moved down (head-down), the ink ribbon 25 and the label paper 22 are pressed on the platen roller 34 so that ink is thermally transferred from the ink ribbon 25 to the label paper 22 to carry out a printing. Further, when moved up (head-up), the thermal head 35 is separated from the platen roller 34 to be in a non-printing state.

That is, the thermal head 35 moved down and located at the first position is in a printing state, and the thermal head 35 moved up and located at the second position is in a non-printing state.

A cutter 36 is arranged in a paper discharge conveyance path for the paper D between the platen roller 34 and the discharging opening 14. A printed paper D is conveyed to the discharging opening 14 along the paper discharge conveyance path under conveyance forces of the platen roller 34 and the conveyance roller 31. The paper D is discharged from the discharging opening 14 with a plurality of label papers 22 adhered on the backing paper 23, and in a case of a cutoff instruction, the backing paper 23 is cut off by the cutter 36 at a specific position between the rear end of a printed label paper 22 and the front end of a next label paper 22 to be printed. The conveyance operation of the platen roller 34 and the conveyance roller 31 is interrupted when the cutter 36 carries out the cutoff.

After a cutoff operation for the paper D is ended, the platen roller 34 and the conveyance roller 31 are rotationally driven towards a reverse direction to convey the paper D for only a given distance towards the reverse direction. The conveyance of the paper D towards the reverse direction enables an unprinted label paper 22 at a prior position to return to a given printing position where the label paper 22 waits to be printed.

In the embodiment, when the paper D is conveyed towards the reverse direction, the head-up operation of the thermal head 35 is completed and the clamping of the ink ribbon 25 and the paper D between the platen roller 34 and the thermal head 35 is released. In this case, if the paper D is conveyed to a cutoff position according to the cutter 36, then the head-up operation of the thermal head 35 may start before or after a cutoff operation.

A cutter main body 37 is arranged vertically movably in the upper of the cutter 36 which is across the paper discharge conveyance path, and a cutter stand 38 against which the cutter main body 37 strikes is fixed on the paper discharge conveyance path. The cutter 36 drives a cutter activator mechanism (not shown) which takes an actuator such as an electromagnetic solenoid as a drive source and consists of link mechanisms and the like.

It is a tendency that the ink ribbon is adhered to the paper D when the ambient temperature of the printing apparatus 10 is set to be above a given temperature. Thus, in a case where the ambient temperature detected by the temperature sensor 39 is above the given adhesion temperature at which an adhesion often occurs, the thermal head 35 is moved up when the paper D returns to a printing position.

The paper D cannot be conveyed towards the reverse direction when the ink ribbon 25 is adhered to the paper D and the ink ribbon 25 and the paper D are clamped by the thermal head 35 and the platen roller 34, thus preventing the ink ribbon 25 from being cut off by mistake. That is, the ink ribbon is peeled from the paper D because the thermal head 35 is in a head-up state when the paper D is conveyed towards the reverse conveyance direction. Consequentially, merely the paper D is returned for a given distance in the reverse conveyance direction while the ink ribbon 25 is not draw out by the paper D, which prevents the ink ribbon 25 from being cut off.

Then, the thermal head 35 moves down to be prepared for the next printing after the paper D is reversely conveyed to a specific position.

In the embodiment, the reverse conveyance of the paper D to a specific position can be detected by, for example, counting the reverse conveyance time for the paper D as a specific time (for example, a specific pulse counted in a case of a pulse motor), further, a paper sensor may be set to detect the position of the front end of the reversely conveyed paper D, and reverse conveyance of the paper D is stopped once the paper sensor detects the position of the front end of the reversely conveyed paper D.

Figure 3:
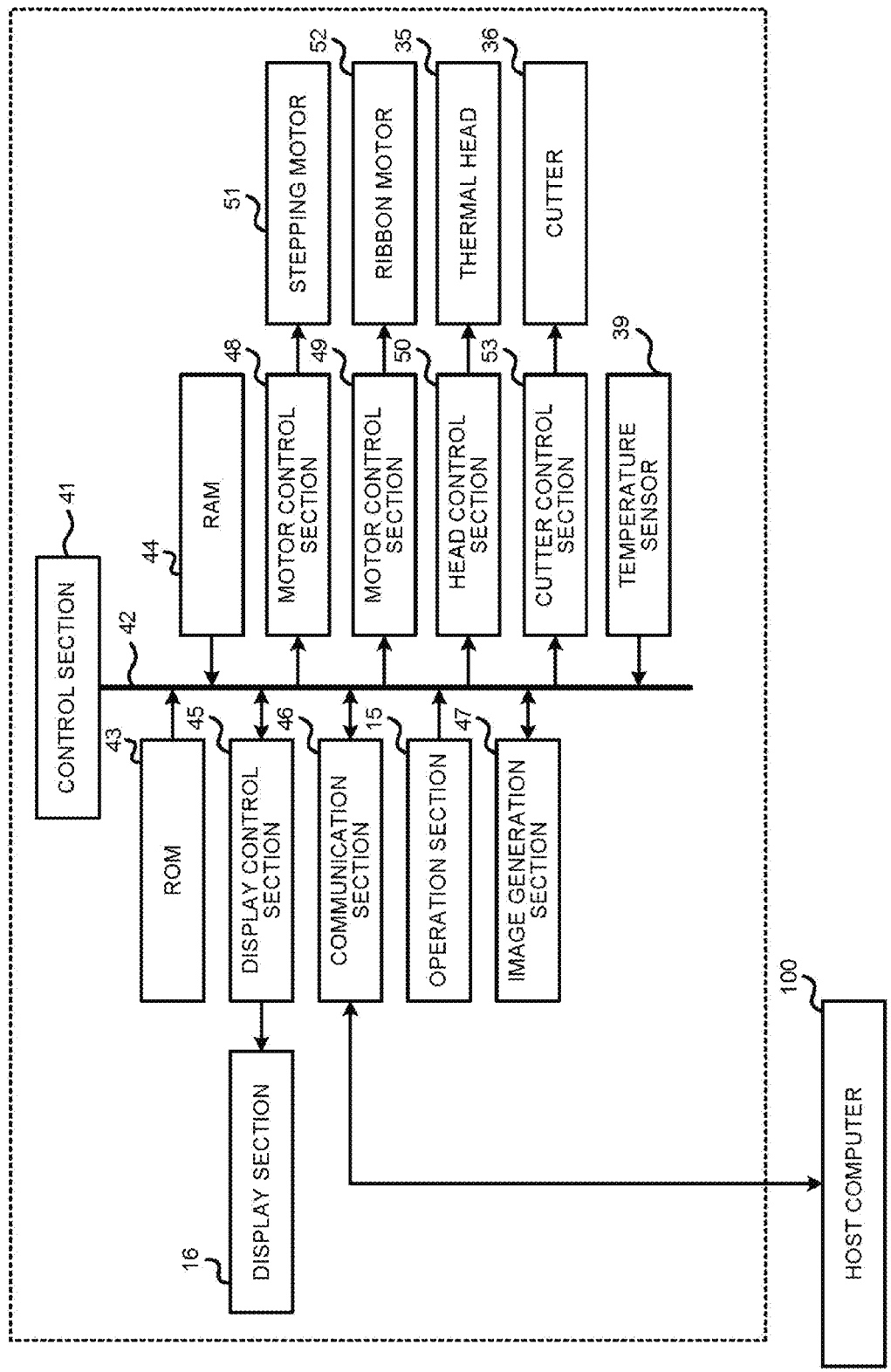
FIG. 3 is a block diagram showing the control system of the printing apparatus shown in FIG. 1.

FIG. 3 is a block diagram illustrating control the execution of the aforementioned head-up operation and reverse rotation operation of the printing apparatus 10.

In FIG. 3, the printing apparatus 10 comprises a control section 41 which is connected with a ROM (Read Only Memory) 43, a RAM (Random Access Memory) 44, a display control section 45, a communication section 46, an operation section 16 and an image generation section 47 via a bus line 42.

The control section 41 comprises a CPU for controlling all operations. Operation information, set information and operation programs are stored in the ROM 43. Various processing information is stored in the RAM 44. The display control section 44 controls the display section 16, and the communication section 46 carries out communication with a host computer 100 arranged externally. The operation section 15 comprises various keys for the operator to input data manually.

The image generation section 47 generates a label image, such as, a barcode or a QR code (registered trademark), to be printed on the label paper 22.

Further, the bus line 42 is connected with motor control sections 48 and 49 and a head control section 50. The motor control section 48 controls the rotation of a stepping motor 51 which rotates to drive the paper roll 21 as well as the conveyance roller 31, the pinch roller 32 and the platen roller 34 constituting the conveyance section. The motor control section 49 controls the rotation of a ribbon motor 52 which drives the ribbon winding shaft 28.

The motor control sections 48 and 49 rotationally control the stepping motor 51 and the ribbon motor 52 in a forward rotation direction and a reverse rotation direction, respectively.

The head control section 50 controls the moving mechanism 36 to enable the thermal head 35 to move up and move down, in this way, the label paper 22 is controlled to be printed or not to be printed and release the ink ribbon from being clamped when the paper D is conveyed towards a reverse direction.

A cutter control section 53 controls an electromagnetic solenoid 54 and drives the cutter 36.

The temperature sensor 39 measures the ambient temperature of the printing apparatus 10 and outputs the measured temperature information to the control section 41. At this time, the control section 41 compares a preset head-up temperature with the measured temperature and conveys the paper D towards the reverse direction when the measured temperature is above the head-up temperature, the head control section 50 enables the thermal head 35 to be moved up, and the motor control sections 48 and 49 rotate the stepping motor 51 and the ribbon motor 52 towards the reverse direction.

Figure 4:
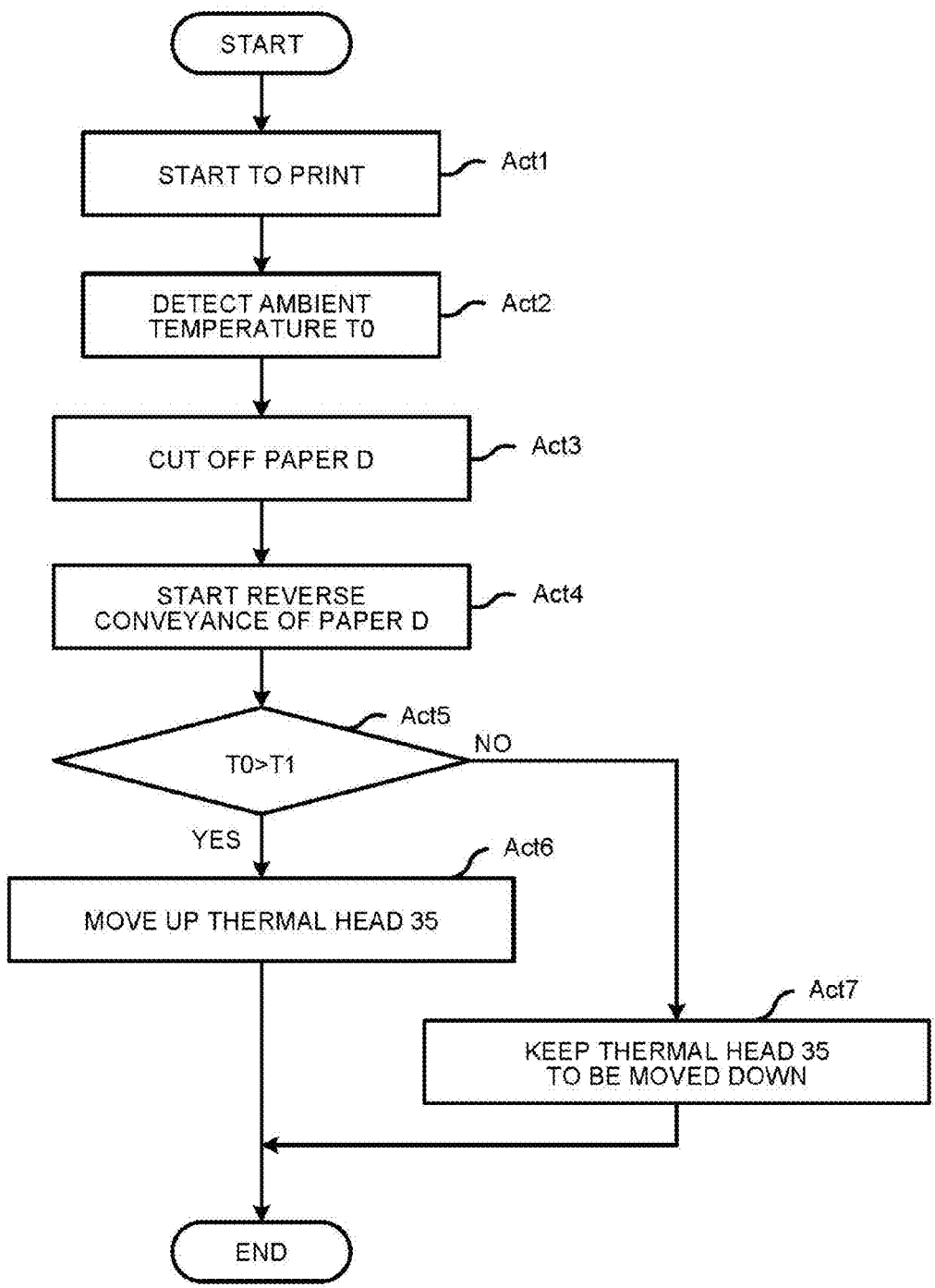
FIG. 4 is a flowchart illustrating the operations shown in the block diagram of FIG. 3.

FIG. 4 is a flowchart illustrating the flow of the head-up operation of the thermal head 35 when the paper D is reversely conveyed according to the control section 41.

First, in Act 1, the paper D is printed while the thermal head 35 is moved down, and then the flow proceeds to Act 2.

In Act 2, the temperature sensor 39 detects ambient temperature (T0), and then the flow proceeds to Act 3.

In Act 3, the printed paper D is cut off by the cutter 36, and then the flow proceeds to Act 4.

In Act 4, the motor control section 48 instructs the stepping motor 51 to rotate reversely, thereby starting the reverse conveyance of the paper D. Further, the motor control section 49 instructs the ribbon motor 52 to rotate reversely to rotate the ink ribbon roll 27 reversely, and then the flow proceeds to Act 5.

In Act 5, whether or not the ambient temperature (T0) is above the set temperature (T1) is determined. If the ambient temperature (T0) is above the set temperature (T1), due to the possible adhesion of the ink ribbon to the paper D, the flow proceeds to Act 6 to enable the thermal head 35 to be moved up. Further, the flow proceeds to Act 7 when the ambient temperature (T0) is below the set temperature (T1). In Act 7, the thermal head 35 is kept in a head-down state as it is not possible that the ink ribbon is adhered to the paper D.

Thus, according to the embodiment, even if in the case that the ink ribbon is adhered to the paper D when the ambient temperature becomes high, due to the thermal head 35 is moved up when the ink ribbon and the paper D are conveyed in the reverse direction, the ink ribbon is protected from being ruptured.

In the processing illustrated in FIG. 4, it is exemplarily in the case that a processor for processing internal data executes the programs pre-stored in the storage area of the printing apparatus 10, however, programs may be downloaded to the printing apparatus from the Internet, it may also make the programs being stored in a recording medium readable to a computer, and then installed in the printing apparatus. The recording medium may be any computer-readable recording medium that is capable of storing programs, such as a RAM (Random Access Memory), a ROM (Read Only Memory), a DRAM, a SRAM (Static Random Access Memory), a VRAM (Video RAM) and a flash memory.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A printing apparatus, comprising:
an ink ribbon conveyance section configured to convey an ink ribbon through a printing section;
a recording medium conveyance section configured to convey a recording medium to a paper discharging opening through the printing section;
a thermal head which comprises, in the printing section, heat generating elements for thermally transferring the ink of the ink ribbon onto the recording medium;
a platen member configured in the printing section opposite to the thermal head;
a thermal head moving section configured to enable the thermal head to press the platen member via overlapped ink ribbon and recording medium so as to move the thermal head between a first position where a thermal transferring is carried out onto the recording medium and a second position where the thermal head is separated from the platen member;
a temperature measurement section configured to measure ambient temperature; and
a control section configured to drive the thermal head moving section to move the thermal head to the second position when the recording medium is conveyed in a conveyance direction reverse to a conveyance direction for printing and when the ambient temperature measured by the temperature measurement section is above a specific head-up temperature.

2. The printing apparatus according to claim 1, wherein a cutter is configured between the printing section and the paper discharging opening to cut off the recording medium.

3. The printing apparatus according to claim 2, wherein after being cut off by the cutter, the recording medium is conveyed for a given distance in the reverse conveyance direction.

4. The printing apparatus according to claim 1, wherein the recording medium is paper wound in the rolled shape.

5. The printing apparatus according to claim 1, wherein the head-up temperature is a temperature at which the ink ribbon is adhered to the recording medium.

6. A printing method, comprising:
conveying an ink ribbon through a printing section; and
conveying a recording medium to a paper discharging opening through the printing section, wherein
in the printing section, the ink of the ink ribbon is thermally transferred onto the recording medium by a thermal head equipped with heat generating elements,
a platen member is configured in the printing section opposite to the thermal head;
during a printing process, the thermal head is moved to a first position and presses the platen member via overlapped ink ribbon and recording medium to carry out a thermal transferring onto the recording medium; and the thermal head is moved to a second position where the thermal head is separated from the platen member when the recording medium is conveyed in a conveyance direction reverse to a conveyance direction for printing and when the ambient temperature measured by the temperature measurement section is above a specific head-up temperature.

7. The printing method according to claim 6, wherein after being cut off by a cutter arranged between the printing section and the paper discharging opening, the recording medium is conveyed for a given distance towards the reverse conveyance direction.

8. The printing method according to claim 6, wherein the head-up temperature is a temperature at which the ink ribbon is adhered to the recording medium.

* * * * *